United States Patent [19]

Fleming et al.

[11] 4,084,260
[45] Apr. 11, 1978

[54] BEST MATCH CONTENT ADDRESSABLE MEMORY

[75] Inventors: David Leslie Fleming; Leslie Matthew Jenson; Gerald Francis Sauter, all of St. Paul, Minn.

[73] Assignee: Sperry Rand Corporation, New York, N.Y.

[21] Appl. No.: 704,860

[22] Filed: Jul. 12, 1976

[51] Int. Cl.$^2$ ............................................. G11C 15/00
[52] U.S. Cl. ....................................... 364/900; 365/49
[58] Field of Search .................... 340/172.5, 173 AM; 364/900 MS

[56] References Cited

U.S. PATENT DOCUMENTS

| | | | |
|---|---|---|---|
| 3,540,002 | 11/1970 | Clapper | 340/173 AM X |
| 3,548,385 | 12/1970 | Tunis | 340/172.5 |

Primary Examiner—Raulfe B. Zache
Attorney, Agent, or Firm—Kenneth T. Grace; William E. Cleaver; Marshall M. Truex

[57] ABSTRACT

A method of and an apparatus for determining the best match, i.e., minimum Hamming distance, between a search word and a plurality of file words is disclosed. The method involves simultaneously comparing the search word to a file word and to a match word. If the comparison indicates that the file word is a better match than the match word, the file word becomes the match word and the next file word is compared to the new match word. The operation continues until all the file words have been operated upon such that the last match word becomes the best match word.

3 Claims, 2 Drawing Figures

BEST MATCH CONTENT ADDRESSABLE MEMORY

BACKGROUND OF THE INVENTION

It is well known that binary digital memories have been used as means for locating data associated with an identifying key word—see the publication "Associative Memories," Electronic Design, A. Corneretto, Feb. 1, 1963, pages 40–55. Such memory systems, usually identified as associative memories, consist of two basic memories or subsystems; a search memory and an associated memory. The search memory is that part of the associative memory that contains the descriptive material, search memory words, or designator words that are to be compared with the datum word or search word; while the associative memory contains the data that are particularly associated with the descriptive criteria stored in the search memory. Stated another way, the search memory may contain a plurality of multibit words that describe and are individually related to other individual multibit words that are stored in the associated memory; the multibit search word is compared with the search memory word, as for example when a search function is defined as "locate all the search memory words that are equal to the search words"; the search memory provides an output signal indicative of the address in the associated memory in which the associated data, i.e., the data associated with a particular search memory word is located; and, the associated memory is accessed for the associated data, i.e., the data in the associated memory that are associated with the search memory word that satisfied the search criteria, see the W. W. Davis U.S. Pat. No. 3,387,274. Such associative memory may perform many such functions such as: equal, greater than or equal to, less than or equal to, between limits, next higher, etc.— see the E. Joseph U.S. Pat. No. 3,332,069. Recent associative memories have incorporated the use of large capacity shift register memories to implement the search function utilizing the latest medium scale integrated (MSI) and large scale integrated (LSI) technologies, see the publication "Parallel Search of Shift Register Storage," H. Ruzicka, IBM Technical Disclosure Bulletin, Volume 17, No. 3, August, 1974, pages 807–808. The present invention is considered to be an improvement over these known prior art associative memories.

SUMMARY OF THE INVENTION

The present invention is directed toward a method of and an apparatus for determining the best match, i.e., minimum Hamming distance, between a search word and a plurality of file words. The method involves storing the first of a plurality of file words in a file word register, storing a match word in a match word register and storing a search word in a search word register. Using XOR gates, the Hamming distances between the search word and the file word and between the search word and the match word are determined in parallel and then the two Hamming distances are compared using two Kirchhoff current adders and a current comparator. If the Hamming distance between the search word and the file word is equal to or greater than the Hamming distance between the search word and the match word, the match word is retained in the match word register and the operation is performed on the next file word. However, if the Hamming distance between the search word and the file word is less than the Hamming distance between the search word and the match word, the file word is transferred into the match word register to become the new match word, and the operation is performed on another file word. The operation continues until all the file words have been operated upon such that the last match word stored in the match word register becomes the best match word.

DESCRIPTION OF THE PREFERRED EMBODIMENT

Figure 1:
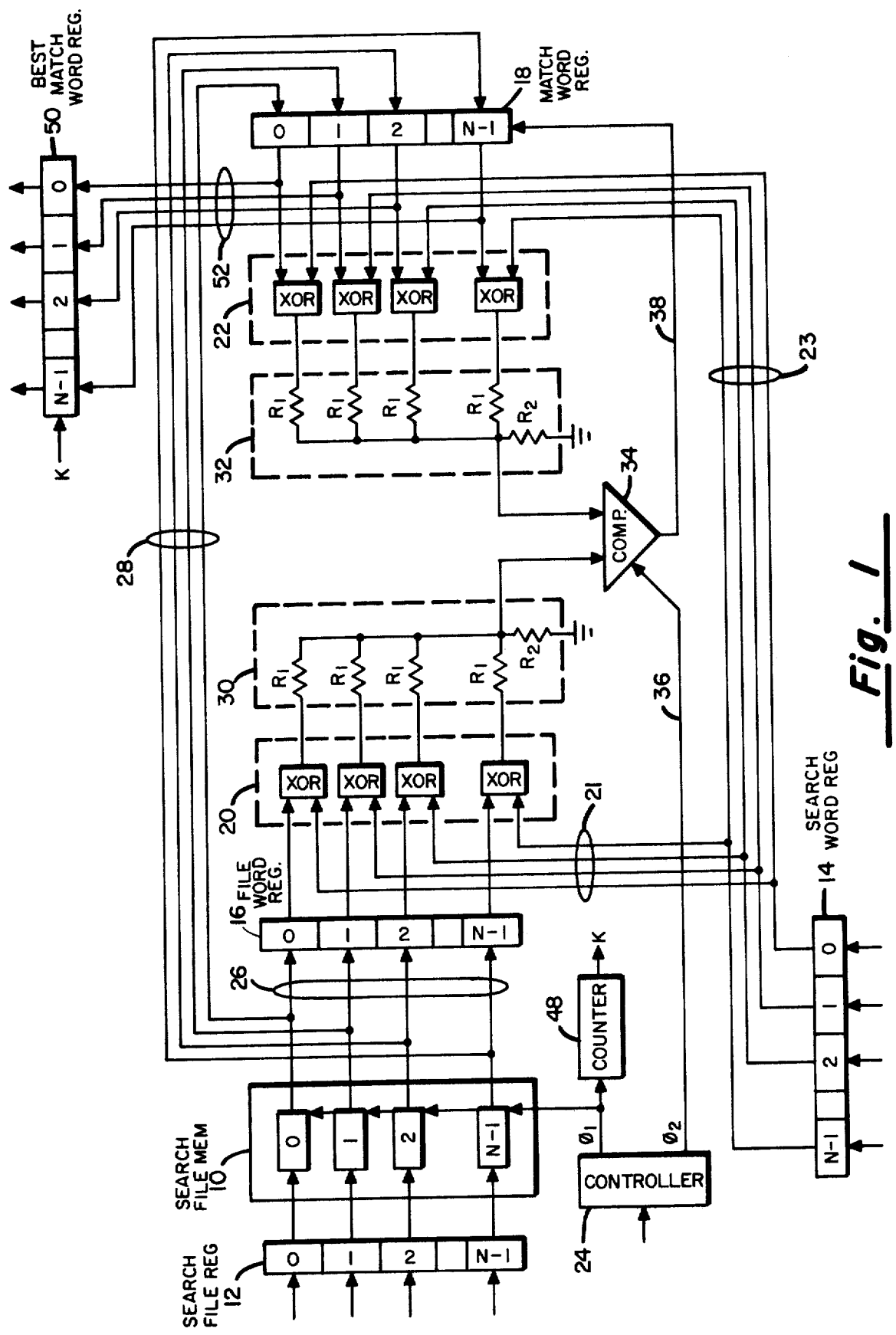
FIG. 1 is a block diagram of the best match content addressable memory of the present invention.

With particular reference to FIG. 1 there is presented a block diagram of the best match content addressable memory of the present invention. In this embodiment a plurality M of N-bit file words are priorly stored in search file memory 10 which search file memory 10 consists of N shift registers O through N-1, each of M stages in length. The M file words are serially entered into the lefthand end or stage of the N shift registers via search file register 12 with each bit of each file word entered into, in parallel, the correspondingly, like-ordered shift register of search file memory 10, i.e., bit O of the file word is entered into the lefthand stage of shift register O while, concurrently bit N-1 of the file word is entered into the lefthand stage of shift register N-1. Additionally, the search word is entered into search word register 14. During this initial, or housekeeping, operation prior to initiating the best match operation, file word register 16 and match word register 18 are master cleared to contain all 0's.

At this time it may be best to define some of the terms used herein:

File word—an N-bit word held in file word register 16.

Match Word—an N-bit word held in match word register 18.

Search word—an N-bit word held in search word register 14 that is concurrently compared to the file word and the match word for minimum Hamming distance.

Hamming distance—the number of like-ordered bits of two words that are complements.

To best describe a typical operation of the best match content addressable memory of the present invention, as illustrated in FIG. 1, assume that the length N of the file word that are to be operated upon is $N = 8$ and the number M of file words that are to be stored in the search file memory 10 is $M = 1024$ so that search file memory 10 is comprised of 8 shift registers each of 1024 stages in length. At a time prior to time $t_0$ assume that search file memory 10 is loaded with a list of file words partially exemplified by Table A and that file word register 16, match word register 18 are master cleared. Also assume that the search word

SW 1 0 1 1 0 1 1 1 has been loaded into search word register 14 and that the ordered bits thereof have been coupled to the corresponding XOR's of exclusive OR gates 20 and 22 via the correspondingly ordered lines of cables 21 and 23, respectively. At a time $t_0$, controller 24, which is a two-phase clock signal generator operating at a frequency of F = 1 Megahertz (MHz), is triggered generating the two-phase $\phi_1$ and $\phi_2$ signals of FIG. 2. The first phase signal $\phi_1$ is coupled to search file memory 10 causing the contents of the eight shift registers of search file memory 10 to be shifted, in parallel, one stage to the right. This shifting of the M file words causes the 8 bits of the file word that are held in the righthand stages of the eight shift registers to be coupled to the correspondingly ordered lines of cable 26 and thence to be loaded into file word register 16 and also to be coupled to but not loaded into match word register 18 via the correspondingly ordered lines of cable 28.

At this time, at time $t_0,\phi_1$ XOR gate 20 performs the following logic operation

```
SW  1 0 1 1 0 1 1 1
FW  0 1 0 1 1 1 0 1
    1 1 1 0 1 0 1 0
``` giving a Hamming distance of 5 while XOR gate 22 performs the logic addition

```
SW  1 0 1 1 0 1 1 1
MW  0 0 0 0 0 0 0 0
    1 0 1 1 0 1 1 1
``` giving a Hamming distance of 6.

TABLE A

| TIME | FILE WORD | HAM DIST | $\phi_1$ | $\phi_2$ | GATE 16 | HAM DIST | MATCH WORD |
|---|---|---|---|---|---|---|---|
| | SEARCH WORD 10110111 | | | | | | |
| $t_0$ | 01011101 | 5 | x | | | 6 | 00000000 |
| | | | | x | x | 5 | 01011101 |
| $t_1$ | 11011010 | 5 | x | | | 5 | 01011101 |
| | | | | x | | 5 | 01011101 |
| | | | | | x | 5 | 01011101 |
| $t_2$ | 11001000 | 7 | x | | | 5 | 01011101 |
| | | | | x | | 5 | 01011101 |
| | | | | | x | 5 | 01011101 |
| $t_3$ | 11010100 | 4 | x | | | 5 | 01011101 |
| | | | | x | | 5 | 01011101 |
| | | | | | x | 4 | 11010100 |
| $t_4$ | 01001000 | 8 | x | | | 4 | 11010100 |
| | | | | x | | 4 | 11010100 |
| | | | | | x | 4 | 11010100 |
| $t_5$ | 01011000 | 7 | x | | | 4 | 11010100 |
| | | | | x | | 4 | 11010100 |
| | | | | | x | 4 | 11010100 |
| $t_{31}$ | 01110110 | 3 | x | | | 4 | 11010100 |
| | | | | x | | 4 | 11010100 |
| | | | | | x | 3 | 01110110 |
| $t_{74}$ | 10111101 | 2 | x | | | 3 | 01110110 |
| | | | | x | | | |
| | | | | | x | 2 | 10111101 |
| $t_{105}$ | 10110101 | 1 | x | | | 2 | 10111111 |
| | | | | x | | | |
| | | | | | x | 1 | 10110101 |
| $t_{247}$ | 00110111 | 1 | x | | | 1 | 10110101 |
| | | | | x | | | |
| | | | | | x | 1 | 10110101 |
| $t_{516}$ | 10110110 | 1 | x | | | 1 | 10110101 |
| | | | | x | | | |
| | | | | | x | 1 | 10110101 |
| $t_{723}$ | 10110111 | 0 | x | | | 1 | 10100101 |
| | | | | x | | | |
| | | | | | x | 0 | 10110111 |
| $t_{724}$ | 01111011 | 4 | x | | | 0 | 10110111 |
| | | | | x | | | |
| | | | | | x | 0 | 10110111 |
| $t_{1023}$ | 10110110 | 1 | x | | | 0 | 10110111 |
| | | | | x | | | |
| | | | | | x | 0 | 10110111 |

XOR gates 20 and 22 couple 5 and 6, respectively, logic 1's representative of the corresponding Hamming distances to the corresponding $R_1$ resistance legs of resistance ladders 30 and 32. This causes resistance ladders 30 and 32 to generate the corresponding current signals of magnitudes 5 and 6, respectively, that are then coupled to the corresponding $R_2$ resistance leg and the corresponding input to comparator 34.

Next, at time $t_0,\phi_2$ the second phase $\phi_2$ signal from controller 24 via line 36 gates the output of comparator 34, via line 38 to match word register 18. As the Hamming distance (5) and the corresponding current magnitude determined by XOR gate 20 and resistance ladder 30 is less than the Hamming distance (6) and the corresponding current magnitude determined by XOR gate 22 and resistance ladder 32, comparator 34 generates a comparator output signal, which, via line 38, gates, via the correspondingly ordered lines of cable 28, the file word

FW 0 1 0 1 1 1 0 1 that is presently stored in file word register 16 into match word register 18 so that the previously compared-to file word becomes the new match word.

Figure 2:
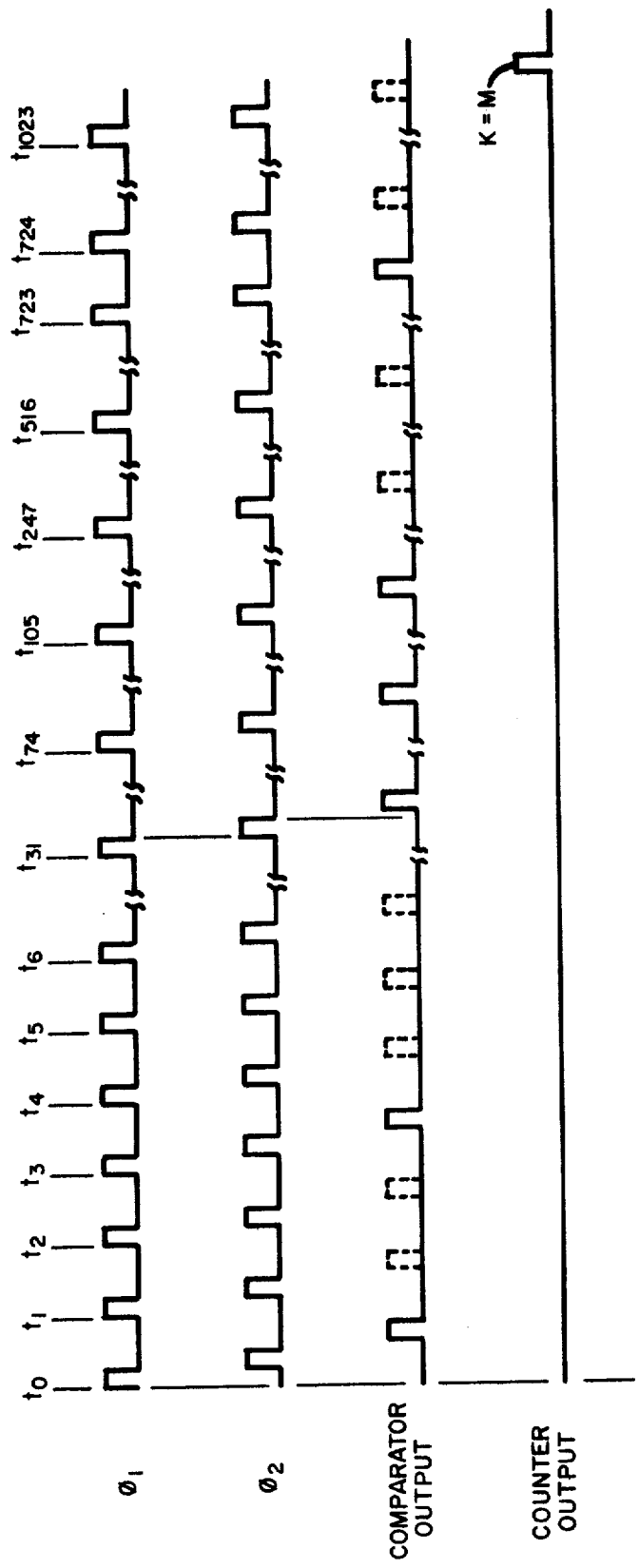
FIG. 2 is a timing diagram that illustratively describes the operation of the best match content addressable memory of FIG. 1.

Referring to Table A and FIG. 2, it can be seen that controller 24 continues generating its two-phase signals, $\phi_1$, $\phi_2$ at a frequency F, shifting the file word in search file memory 10 into file word register 16, generating the Hamming distance current magnitude representations of the comparisons of the search words in search word register 14 to a file word in file word register 16 and to the match word in match word register 18, and transferring the file word in file word register 16 into match word register 18 to form the new match word if the comparison so indicates. When the counter 48, driven at the frequency F by controller 24 counts to a count K = M, it couples a best match word transfer signal K to best match word register 50. At this time, after the completion of the best match search of search file memory 10, the match word held in match word register 18 is, via the correspondingly ordered lines of cable 52, transferred into best match word register 50 to become the best match word.

What is claimed is:

1. A best match content addressable memory, comprising:

a search file memory for storing M file words, each of N-bits in length;

a file word register coupled to said search file memory for storing one of said M file words;

a match word register coupled to said search file memory for storing a selected one of said M file words as a match word;

a search word register for storing a search word of N-bits in length;

first means responsively coupled to said file word register and to said search word register for generating a first Hamming distance representation of the file word and the search word;

second means responsively coupled to said match word register and to said search word register for generating a second Hamming distance representation of the match word and the search word;

comparator means responsively coupled to said first and second means, comparing said first and second Hamming distance representations for transferring said file word into said match word register only if said first Hamming distance is less than said second Hamming distance.

2. The best match content addressable memory of claim 1 in which said first means comprises:

N XOR's, each separate one responsively coupled to a like-ordered stage of said search word register and of said file word register;

a resistor ladder network having N resistor legs, each resistor leg coupled to the output of a separate associated one of said N XOR's, the other ends of which are common coupled to a first input terminal of said comparator means;

and in which said second means comprises:

N XOR's, each separate one responsively coupled to a like-ordered stage of said search word register and of said match word register;

a resistor ladder network having N resistor legs, each resistor leg coupled to the output of a separate associated one of said N XOR's, the other ends of which are common coupled to a second input terminal of said comparator means.

3. The best match content addressable memory of claim 1 in which said search file memory comprises:

N shift registers, each of M bits in length, each separate one of said N shift registers storing the like-ordered bit of said M file word and coupling, in parallel, each of the N bits of a given file word to the like-ordered stage of said file word register.

* * * * *